United States Patent

Miller et al.

(10) Patent No.: US 8,608,175 B2
(45) Date of Patent: Dec. 17, 2013

(54) MECHANICAL FACE SEAL STOP PIN

(75) Inventors: Jonathan L. Miller, East Hampton, CT (US); Stephen P. Wolensky, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 2066 days.

(21) Appl. No.: 11/262,454

(22) Filed: Oct. 28, 2005

(65) Prior Publication Data

US 2007/0096399 A1 May 3, 2007

(51) Int. Cl.
*F16J 15/34* (2006.01)

(52) U.S. Cl.
USPC ............................................. 277/373; 277/375

(58) Field of Classification Search
USPC .................. 277/370, 372, 373, 377, 385, 390
See application file for complete search history.

(56) References Cited

U.S. PATENT DOCUMENTS

| | | | | | |
|---|---|---|---|---|---|
| 3,320,987 | A | * | 5/1967 | Pelzel | 99/578 |
| 4,687,346 | A | * | 8/1987 | Suciu | 384/99 |
| 5,137,284 | A | * | 8/1992 | Holder | 277/390 |
| 5,364,138 | A | * | 11/1994 | Dietrich et al. | 292/1.5 |
| 6,145,840 | A | * | 11/2000 | Pope | 277/348 |
| 6,371,488 | B1 | * | 4/2002 | Szymborski et al. | 277/365 |
| 6,464,231 | B2 | * | 10/2002 | Burroughs | 277/385 |
| 6,676,369 | B2 | * | 1/2004 | Brauer et al. | 415/113 |
| 6,695,315 | B1 | * | 2/2004 | Anderberg | 277/369 |
| 6,758,477 | B2 | * | 7/2004 | Brauer et al. | 277/409 |
| 2003/0042683 | A1 | * | 3/2003 | Takahashi | 277/370 |
| 2003/0184022 | A1 | * | 10/2003 | Brauer et al. | 277/412 |
| 2003/0185669 | A1 | * | 10/2003 | Brauer et al. | 415/111 |

* cited by examiner

*Primary Examiner* — Gilbert Lee
(74) *Attorney, Agent, or Firm* — Carlson, Gaskey & Olds, P.C.

(57) ABSTRACT

A mechanical face seal arrangement includes a seal member having an annular seal element for sealing against a rotatable seal surface. The seal member includes guide slots that cooperate with the guide member to establish a direction of seal member movement. The guide member includes stops to establish a range of movement of the seal member along the direction of seal member movement.

9 Claims, 3 Drawing Sheets

MECHANICAL FACE SEAL STOP PIN

BACKGROUND OF THE INVENTION

This invention relates to mechanical face seals and, more particularly, to an arrangement and method for establishing a range of movement of a mechanical face seal.

Conventional mechanical face seals are used in rotating equipment, such as gas turbine engines, to provide a seal between regions of high and low fluid pressure and temperature. For example, mechanical face seals are used for sealing a rotating shaft on a pump, compressor, agitator, gas turbine, or other rotating equipment. In gas turbine engines, mechanical face seals are used to prevent hot, high pressure air from entering a bearing compartment that operates at a lower pressure and temperature.

A conventional metal-backed face seal arrangement for a gas turbine engine includes an annular graphitic carbon ring secured to a rotationally static, axially translatable, annular metal seal housing. A seal seat is affixed to a rotatable engine main shaft and positioned axially adjacent to the graphitic carbon ring. A nose of the annular graphitic carbon ring is urged into contact with the seal seat by a combination of spring forces acting on the seal housing and the net resultant of axially opposing fluid pressure forces. The contact between the nose and the seal seat resists fluid leakage across the seal arrangement in the radial direction.

Typically, a conventional graphitic carbon ring mechanical face seal arrangement includes between six and twelve spring guides affixed to a non-rotatable support or seal housing. The seal housing axially translates along the spring guides. A coil spring is arranged coaxially about each spring guide between the seal housing and the support to provide a bias force that urges the graphitic carbon ring into contact with the seal seat. Disadvantageously, the six to twelve spring guides and six to twelve corresponding coil springs are time consuming to install and add expense to the arrangement. Functionally, the seal seat limits movement of the seal arrangement in one axial direction, however, only the support limits movement in the opposite direction. This may undesirably damage the support and seal arrangement, or over-compress and over-stress one or more of the coil springs.

Accordingly, there is a need for a simplified and robust gas turbine engine shaft seal arrangement having a limited range of movement to protect the seal arrangement from interfering with a support or over-compressing a spring.

SUMMARY OF THE INVENTION

A gas turbine engine mechanical face seal arrangement according to the present invention includes a seal member having an annular seal element for sealing against a rotatable seal surface. The seal member includes guide slots that cooperate with a guide member to establish a direction of seal member movement. The guide member includes stops to establish a range of movement of the seal member along the direction of seal member movement. The limited range of motion of the seal member protects a bias spring from being over-compressed or over-stressed.

One exemplary gas turbine engine mechanical face seal arrangement includes a spacer between the seal member and at least one of the guide members. The spacers provide anti-rotation of the seal member, axial travel guidance of the seal member and reduces friction and wear between the seal member and the guide members.

Accordingly, the disclosed examples provide a gas turbine engine mechanical face seal arrangement that provides a limited range of movement to protect the seal arrangement from over-compression and interfering with a support, as well as, to provide proper orientation, guidance and anti-rotation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
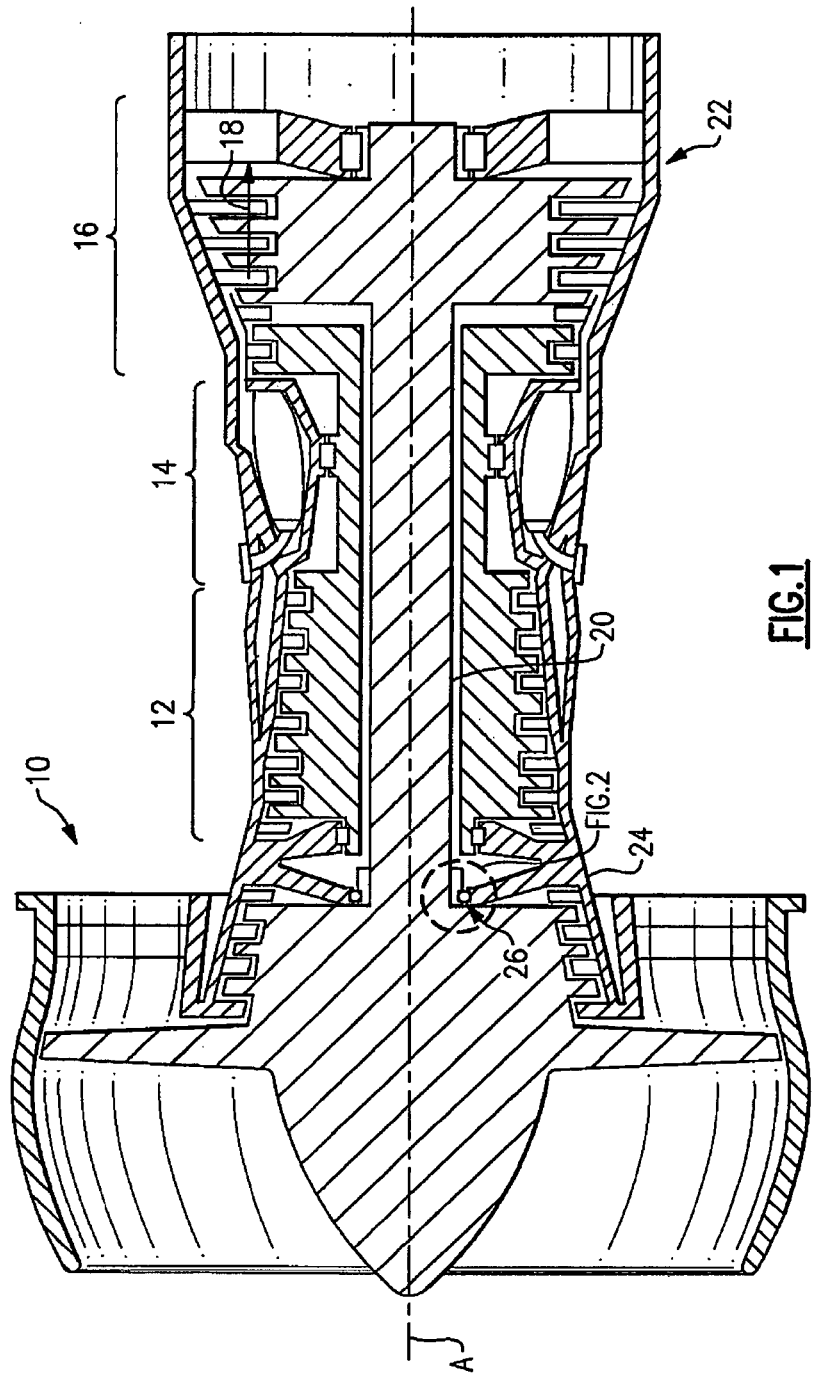
FIG. 1 shows an example gas turbine engine.

FIG. 1 illustrates selected portions of an example rotational assembly 10, such as a gas turbine engine for an aircraft. In this example, the rotational assembly 10 includes a compressor section 12, a combustor section 14, and a turbine section 16. The rotational assembly 10 operates in a known manner, feeding compressed air from the compressor section 12 to the combustor section 14. The compressed air is mixed with fuel and reacts to produce a flow of hot gases 18. The turbine section 16 transforms the flow of hot gases 18 into mechanical energy to rotationally drive a shaft 20, such as a turbine engine main shaft. The shaft 20 is coupled with the turbine section 16 and the compressor section 12 such that the turbine section 16 drives the compressor section 12. An exhaust nozzle 22 directs the hot gases 18 out of the rotational assembly 10. An annular, non-rotatable case 24 provides support for the shaft 20 on a bearing arrangement 26, such as a No. 1 bearing.

Figure 2:
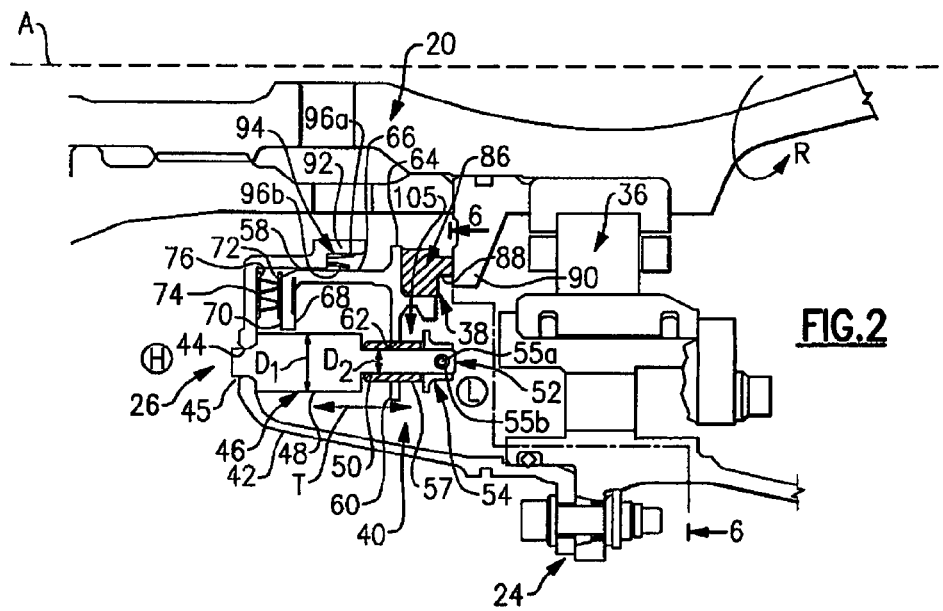
FIG. 2 shows a more detailed view of the bearing arrangement shown in FIG. 1, including a seal arrangement.

FIG. 2 shows a more detailed view of the bearing arrangement 26 shown in FIG. 1. The bearing arrangement 26 includes a bearing 36 mounted between the case 24 and the shaft 20 that provides support for the shaft 20, which rotates about a central axis A. A seal arrangement 38 provides a fluid restriction between a low pressure and temperature (L) bearing chamber 40 and hot, high pressure (H) region outside of the bearing chamber 40.

A support wall 42 includes circumferentially spaced openings 44. Each of the guide members 46, such as a stop pin, includes a head 45 that engages a corresponding opening 44 of the support wall 42 to secure the guide member 46 to the support wall 42. In the illustrated example, an interference fit between the head 45 and the corresponding opening 44 provides a secure connection.

Each guide member 46 includes a base section 48 and a neck section 50. In this example, both the base section 48 and the neck section 50 are cylindrical and have respective diameters $D_1$ and $D_2$. The diameter $D_1$ of the base section 48 is larger than the diameter $D_2$ of the neck section 50. A distal end 52 of the neck section 50 receives a retaining collar 54. The distal end 52 and retaining collar 54 have respective openings 55a and 55b and a fastener F (FIG. 3) is disposed through the openings 55b and 55a to secure the retaining collar 54 on the distal end 52. A spacer sleeve 57 mounts on the neck section 50 of each of the guide members 46. Optionally, spacer sleeves 57 are used on a portion of the guide members 46 to further reduce the number of parts in the assembly.

The guide members 46 support a seal housing 58 and cooperate with the seal housing 58 and spacer sleeves 57 to control a direction of seal housing 58 movement along an axial translation direction T. A flange 60 extends in a radial direction relative to an engine central axis A. The flange 60 includes guide slots 62 that fit onto a corresponding spacer sleeve 57 to axially guide the seal housing 58 and to prevent seal housing 58 rotation. The flange 60 extends from a seal-receiving section 64 of the seal housing 58. A seal housing bore section 66 (one example of a force transfer section) extends axially from the seal-receiving section 64. A contact section 68 extends radially from and is cantilevered from the seal housing bore section 66. In one example, the seal-receiving section 64, seal housing bore section 66, and contact section 68 are integrally formed as a single component.

An axial surface 70 of the contact section 68 includes a wear layer 72 for contact with an annular spring 74. Alternatively, a plurality of coil springs or other types of bias members are used. The support wall 42 also includes a wear layer 76 adjacent to the annular spring 74. The wear layers 72 and 76 provide the benefit of protecting the axial surface 70, support wall 42, and annular spring 74 from wear. In one example, the wear layers 72 and 76 include a coating that is harder than the metal substrate of the respective contact section 68 and support wall 42. The annular spring 74, contact section 68, and support wall 42 may also include a hard coating for wear resistance.

The seal-receiving section 64 includes an annular graphitic carbon ring 86 that is interference fit into the seal-receiving section 64. The graphitic carbon ring 86 includes a nose 88 that contacts seal seat 90 when the seal housing 58 is in a sealing position. In this example, the graphitic carbon ring 86 is at least partially radially aligned (i.e., axially offset) with the annular spring 74. The seal seat 90 rotates with the shaft 20, while the seal arrangement 38 remains static with the case 24.

The support wall 42 includes a seal groove 92 and corresponding seal 94 located radially inward of the seal housing bore section 66. In one example, the graphitic carbon ring 86 is referred to as a primary seal of the bearing chamber 40 and the seal 94 is referred to as a secondary seal that radially seals the seal arrangement 38.

The seal 94 contacts the seal housing bore section 66 of the seal housing 58 to resist fluid leakage across in the axial direction, as the seal member translates axially. The seal 94 is resilient such that the seal 94 maintains a radial bias force against the seal housing bore section 66. Optionally, the seal housing bore section 66 includes a hard coating that extends along at least a portion of the seal housing bore section 66 for enhanced wear resistance. In one example, the seal 94 is made of a durable, low-friction material, such as polytetrafluoroethylene.

During operation of the rotational assembly 10, the net resultant of axially opposing fluid pressure forces and the annular spring 74 provide a bias force on the seal housing 58 to urge the graphitic carbon ring 86 into sealing contact with the seal seat 90, which rotates during rotational assembly 10 operation. The annular spring 74 provides a bias force against the wear layer 72 of the contact section 68, which transfers the force to the seal housing bore section 66 and seal-receiving section 64. The bias force urges the seal housing 58 toward the seal seat 90 to provide a sealing force between the graphitic carbon ring 86 and the seal seat 90.

Figure 3:
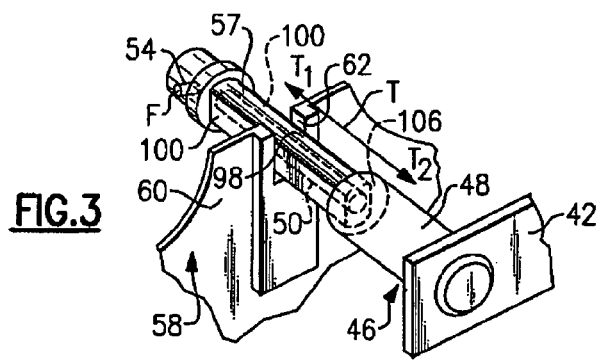
FIG. 3 shows an isometric projected view of an example guide member of the seal arrangement shown in FIG. 2.

Referring to FIG. 3, the guide member 46 axially guides movement of the seal housing 58 along a translation direction T via engagement with the spacer sleeve 57 and flange 60 of the seal housing 58. The spacer sleeve 57 includes rounded sides 98 and flat sides 100. The flat sides 100 correspond to the flat sides of the guide slot 62. The spacer sleeves 57 provide smooth movement of the seal housing 58 along the guide member 46 and reduce friction and wear between the seal housing 58 and neck sections 50.

In the illustrated example, there is a space 105 between the retaining collar 54 and the flange 60. The space 105 allows the nose 88 of the graphitic carbon ring 86 to contact the seal seat 90 when the graphitic carbon ring 86 is in a sealing position. As the nose 88 wears, the space 105 decreases.

The retaining collar 54 secured on the neck section 50 functions as a stop to prevent the seal housing 58 from moving beyond the retaining collar 54 in the direction $T_1$ (e.g., when the nose 88 wears down). The difference in diameter between the base portion 48 and the neck portion 50 provides a stop 106 that stops the seal housing 58 from moving in the direction $T_2$. Thus, the retaining collar 54 and stop 106 define a range of movement of the seal housing 58. This provides the benefit of protecting the annular spring 74 from being overcompressed if the seal housing 58 moves too far in the direction $T_2$, which is a concern with prior shaft seal arrangements.

Figure 4:
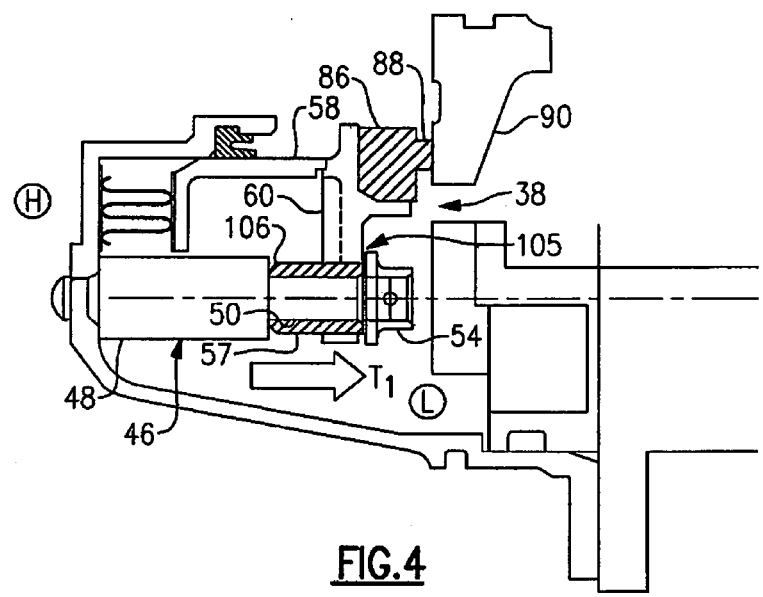
FIG. 4 shows an annular spring biasing a seal member of the seal arrangement of FIG. 2 into engagement with a retaining collar stop.

Referring to FIG. 4, the seal housing 58 is shown in a sealing position wherein the graphitic carbon ring 86 is axially offset from the seal seat 90.

Figure 5:
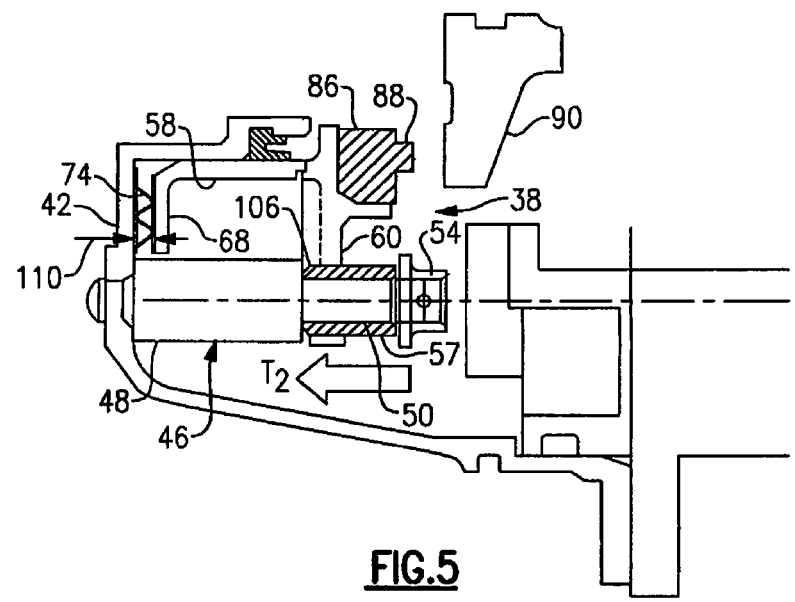
FIG. 5 shows the seal member of FIG. 4 in a retracted position, compressing the annular spring and engaged with a stop.

In the illustrated example, the nose 88 has worn an amount that is greater than the size of space 105 (FIG. 5). The retaining collar 54 contacts the flange 60 and prevents the graphitic carbon ring 86 from further wear against the seal seat 90, which may otherwise result in damage to the seal arrangement 38. The size of the space 105 may be predetermined in a design stage of the seal arrangement 38 and may vary with design.

Referring to FIG. 5, the seal housing 58 is shown in a retracted position wherein the seal housing 58 is moved to the left in the illustration. In a retracted position, the seal housing 58 compresses the annular spring 74 against the support wall 42.

Retraction may occur under any of several different conditions. During pre-assembly of the seal arrangement 38, for example, an operator may retract the seal housing 58 to verify smooth travel of the seal housing 58 along the direction of translation T. The seal housing 58 may also retract under a pressure-reversal condition in which the pressure outside of the bearing chamber 40 becomes lower than the pressure within the bearing chamber 40. In one example, the pressure may reverse if the seal between the nose 88 and the seal seat 90 is lost.

The stop 106 of the guide member 46 limits movement of the seal housing 58 in the direction $T_2$ toward the annular spring 74 and seal 94. This provides the benefit of protecting the annular spring 74 from being over-compressed between the contact section 68 of the seal housing 58 and the support wall 42 and prevents the seal housing 58 from traveling too far and interfering with the support wall 42. That is, if the annular spring 74 is compressed beyond a compression threshold, the annular spring 74 may yield and no longer provide a desirable or design-intended amount of bias force to maintain a seal between the nose 88 and the seal seat 90. Furthermore, the seal-receiving section 68 (FIG. 2) is prevented from contacting the seal 94 or seal groove 92, which may cause damage, and the seal 94 is maintained in contact with the hard coating on the seal housing bore section 66.

In one example, the guide member 46 and stop 106 are designed to provide a desired spacing 110 between the contact section 68 of the seal housing 58 and the support wall 42 when the flange 60 abuts the stop 106. The spacing 110 corresponds to the compression threshold of the annular spring 74, such that the seal housing 58 is unable to compress the annular spring 74 an amount that exceeds the compression threshold. Given this description, one of ordinary skill in the art will recognize that the guide member 46 and stop 106 can alternatively be designed to provide desired spacings between other portions of the seal housing 58 and support wall 42.

Figure 6:
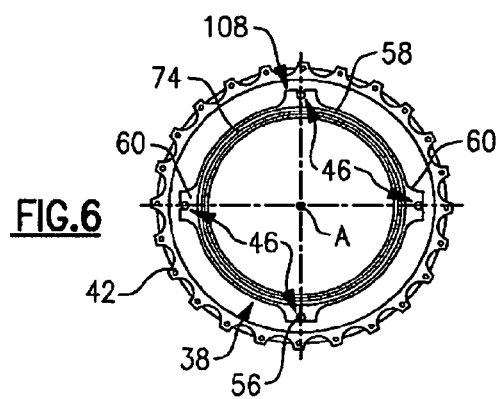
FIG. 6 shows an axial view of example guide member circumferential locations of the seal arrangement shown in FIG. 2.

FIG. 6 is an axial view of portions of the seal arrangement 38 according to the section shown in FIG. 2 (but showing the entire circumference). The seal housing 58 mounts on the guide members 46 at four circumferential locations, for example. One location 108 is slightly off-center to ensure that the seal arrangement 38 is installed in a desired orientation.

Incorporation of the contact section 68 feature into the seal housing 58 enables use of an arrangement that utilizes the annular spring 74 and guide members 46. Utilizing the annular spring 74 eliminates at least the six to twelve individual coil springs and corresponding spring guides known in prior arrangements, and the guide members 46 allow axial guidance of the seal housing 58, proper orientation of the seal arrangement 38, and anti-rotation of the primary seal. The stops on the guide members 46 protect the annular spring 74 from being over-compressed or over-stressed. Thus the simplified arrangement eliminates parts, reduces expense, and provides a robust design.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A mechanical face seal arrangement comprising:
a seal member having an annular seal element that is axially moveable for sealing against a rotatable seal surface, the seal member including a seal housing supporting the annular seal element, the seal housing including a flange having a guide slot; and
a stop in that extends through the guide slot to establish an axial range of movement of the seal member, the stop pin having a first stop limiting movement of the seal housing in a first direction and a second stop limiting movement of the seal member in a second direction opposite of the first direction,
further comprising a spacer sleeve between the flange and the stop pin, the spacer sleeve establishing a spacing between the stop pin and sides of the guide slot of the flange, the spacer sleeve having a non-circular outside surface cross-section, wherein the spacer sleeve is received at least partially into the guide slot.

2. A mechanical face seal arrangement comprising:
a seal member having an annular seal element that is axially moveable for sealing against a rotatable seal surface, the seal member including a seal housing supporting the annular seal element, the seal housing including a plurality of flanges that each have a guide slot;
a plurality of stop pins that extend through respective ones of the guide slots to establish an axial range of movement of the seal member, each of the stop pins having a first stop preventing movement of the seal housing in a first direction and a second stop preventing movement of the seal member in a second direction opposite of the first direction; and
a plurality of spacer sleeves between the flanges and the stop pins, each of the spacer sleeves establishing a spacing between a respective one of the stop pins and sides of the guide slot of a respective one of the flanges, and each of the spacer sleeves having a non-circular outside surface cross-section.

3. The arrangement as recited in claim 2, wherein each of the spacer sleeves includes an opening that is coaxial with a respective one of the plurality of stop pins.

4. The arrangement as recited in claim 2, wherein each of the spacer sleeves includes opposed rounded sides and opposed planar sides.

5. A mechanical face seal arrangement comprising:
a seal member having an annular seal element that is axially moveable for sealing against a rotatable seal surface, the seal member including a seal housing supporting the annular seal element, the seal housing including a plurality of flanges that each have a guide slot;
a plurality of stop pins that extend through respective ones of the guide slots to establish an axial range of movement of the seal member, each of the stop pins having a first stop preventing movement of the seal housing in a first direction and a second stop preventing movement of the seal member in a second direction opposite of the first direction; and
a plurality of spacer sleeves between the flanges and the stop pins, each of the spacer sleeves establishing a spacing between a respective one of the stop pins and sides of the guide slot of a respective one of the flanges, and each of the spacer sleeves having a non-circular outside surface cross-section, wherein the seal member is annular and a first adjacent pair of the guide slots about a perimeter of the seal member are spaced apart less than a second adjacent pair of the guide slots about the perimeter of the seal member.

6. A mechanical face seal arrangement comprising:
a seal member having an annular seal element that is axially moveable for sealing against a rotatable seal surface, the seal member including a seal housing supporting the annular seal element, the seal housing including a flange having a guide slot; and
a stop in that extends through the guide slot to establish an axial range of movement of the seal member, the stop pin having a first stop limiting movement of the seal housing in a first direction and a second stop limiting movement of the seal member in a second direction opposite of the first direction, including an annular bias member that biases the seal member toward the seal surface, wherein the annular bias member is non-coaxial with the stop pin.

7. A mechanical face seal arrangement comprising:
a seal member having an annular seal element that is axially moveable for sealing against a rotatable seal surface, the seal member including a seal housing supporting the annular seal element, the seal housing including a flange having a guide slot; and
a stop in that extends through the guide slot to establish an axial range of movement of the seal member, the stop pin having a first stop limiting movement of the seal housing in a first direction and a second stop limiting movement of the seal member in a second direction opposite of the first direction,
further comprising a spacer sleeve between the flange and the stop pin, the spacer sleeve establishing a spacing between the stop pin and sides of the guide slot of the flange, the spacer sleeve having a non-circular outside surface cross-section.

8. The arrangement as recited in claim 7, wherein the spacer sleeve comprises a solid and continuous body extending between open ends of a central bore of the spacer sleeve.

9. The arrangement as recited in claim 7, wherein the spacer sleeve is mounted on a cylindrical section of the stop pin.

\* \* \* \* \*

UNITED STATES PATENT AND TRADEMARK OFFICE
CERTIFICATE OF CORRECTION

| | | |
|---|---|---|
| PATENT NO. | : 8,608,175 B2 | Page 1 of 1 |
| APPLICATION NO. | : 11/262454 | |
| DATED | : December 17, 2013 | |
| INVENTOR(S) | : Miller et al. | |

It is certified that error appears in the above-identified patent and that said Letters Patent is hereby corrected as shown below:

IN THE CLAIMS:

Claim 1, column 5, line 46: "in" should read as --pin--

Claim 6, column 6, line 45: "in" should read as --pin--

Claim 7, column 6, line 60: "in" should read as --pin--

Signed and Sealed this
Sixth Day of May, 2014

Michelle K. Lee
*Deputy Director of the United States Patent and Trademark Office*